| United States Patent [19] | [11] Patent Number: 4,957,168 |
|---|---|
| Battista | [45] Date of Patent: Sep. 18, 1990 |

[54] METALLIC-SOUNDING PLASTIC HORSESHOES

[76] Inventor: Orlando A. Battista, 3863 SW Loop 820, Suite 100, Fort Worth, Tex. 76133-2076

[21] Appl. No.: 346,719

[22] Filed: May 3, 1989

[51] Int. Cl.$^5$ .............................................. A01L 5/00
[52] U.S. Cl. ................................ 168/4; 168/DIG. 1; 273/427
[58] Field of Search ............. 168/4, DIG. 1; 525/905; 273/427

[56] References Cited

U.S. PATENT DOCUMENTS

| 3,302,723 | 2/1967 | Renkenberger et al. | 168/4 |
|---|---|---|---|
| 3,712,381 | 1/1973 | Fryrear, Jr., et al. | 168/4 |
| 4,265,454 | 5/1981 | Bayless | 273/427 |
| 4,743,651 | 5/1988 | Shibuya et al. | 525/905 X |
| 4,873,287 | 10/1989 | Holub et al. | 525/905 X |

*Primary Examiner*—Robert P. Swiatek

[57] ABSTRACT

A horseshoe molded of a new high impact, high temperature resistant polyphenylene sulfide resin that possesses the unique property of possessing a metallic sound indistinguishable from metal horeshoes. The metallic-sounding plastic horseshoes may be attached to a hoof either by nails or by means of a newer species of super-adhesives. The new metallic-sounding polymer horseshoes have a special advantages over regular metal horseshoes. The new horseshoes are about one-sixth the weight of equivalent size metal horseshoes. They can be adjusted in size and shape by means of heating at or about 450° F. and adjusting of the size and shape to fit the hoof. They possess unique chemical, abrasion, and shock resistance. Their lightweight, metal appearance, and metallic sound make them most suitable for sportswear; also, children and the elderly may now enjoy this healthful sport.

11 Claims, No Drawings

METALLIC-SOUNDING PLASTIC HORSESHOES

BACKGROUND OF THE INVENTION

The present invention relates to novel lightweight shoes suitable for horses or any animal requiring hoof protection. Another use of the present invention is to provide lightweight pitching horseshoes for women, children, and the elderly. The foregoing products are prepared from a new class of plastic polymers known as "polyphenylene sulfides" which-when converted into horseshoes for shoeing horses with nails and/or special adhesives or into lightweight sportswear-exhibit a typical metallic sound when struck together or thrown onto solid surfaces, a metallic sound clearly identical to solid metallic horseshoes.

One of the major causes of lameness in hores is the direct result of metal horseshoes. They restrict the natural flexing (i.e. expansion and contraction) of the horse's foot, maximize concussion, cause corns, enhance fatigue from their heavy weight, inflict severe cuts and bruises, and provide inadequate protection. Whether used for pleasure, work, or competition, horses are used on a wide variety of surfaces, natural and/or artificial, which can cause overstressing and can damage tendons, cartilage, and bone. It has been suggested that fatigue failure is a major cause of lameness, and lameness is directly related to the hardness of the surface on which horses are used. A linear, direct relationship between lameness on racetracks and the hardness of the tracks has been demonstrated experimentally. The peak shock-level on a horses's hoof is about 2,000 pounds of force when galloping across pavement or hard dirt and 800–1,000 pounds when on grass. This shock can be greatly reduced by using a shoe that has good shock and impact resistance properties. When shock and concussion are reduced on the horse's feet and legs, lameness is always reduced.

With the increasing number of pleasure horses, work horses (e.g. metropolitan mounted police), and draft horses being used on paved surfaces, there is also concern being given to the damage hard metal shoes cause to the surfaces. Indeed the industry, at large, has expressed growing concern over the above-mentioned problems as well as the subsequent increased costs of street and road maintenance and repair. Horse owners, including trail riders, Amish draft horse users, and municipalities, are anxious to replace hard metal shoes with more resilient, less damaging shoes. Similarly, the destruction and enhanced wear on private barn floors, walkways, and surfaced paths resulting from hard metal horseshoes is significant. Unfortunately, in the past none of the lighter weight plastic shoes have measured up to expectations. Another concern to the horse owner that results from the use of hard metal shoes in the restricted "natural" action of the hoof. When a horse is in motion, the natural movement of the hoof is to expand slightly under weight and to contract when the animal's weight is shifted. Rigid metal shoes restrict this natural hoof action, which further contributes to fatigue and lameness. A further disadvantage to the use of hard, rigid shoes occurs when this natural hoof flexing is restricted by the shoe. This results in a tendency to place considerable stress on the nails holding the rigid shoe to the hoof that normally expands and contracts, causing the loosening of the nails or pulling of the nails through the hoof and eventually throwing the shoe. A heavy, hard metal shoe that comes loose or is thrown can inflict severe cuts or bruises to the animal.

Accordingly, there exists a need for a light-weight, shock absorbent, abrasion resistant, partially-flexible horseshoe that will provide therapeutic advantages to the animal and minimize damage to the surfaces on which the animal is used.

Many attempts have been made in prior art to provide a protective device for the horse's foot incorporating the objectives mentioned above. For example, the hoof coverings described in U.S. Pat. Nos. 4,235,292, and 4,206,811 consist of an integrally-designed steel yoke in a plastic body attached with screws. U.S. Pat. No. 4,346,762 involved a combination of plastic horseshoes wherein two parts were pre-united in the toe region. U.S. Pat. Nos. 4,189,004 3,703,209 and 3,732,929 teach that polyurethane-type horseshoes have desirable characteristics. A hard rubber sheet containing small metal fragments is described in U.S. Pat. No. 3,513,915. Indeed, cast polyurethane horseshoe appear to be the preferred material for flexible horseshoes, as described in U.S. Pat. Nos. 3,494,422, 3,490,536, 3,469,631, and 3,603,402. U.S. Pat. No. 4,496,002 describes the use of polyethylene resin for making horseshoes. The types of shoes as described in these references overcome some, but not all, of the recognized shortcomings of metal horseshoes; none has yet received widespread commerical use.

OBJECTS OF THE INVENTION

An existing need remains for an economical, lightweight horseshoe which will protect the horse's hooves and be simple to attach to and remove from the horse's hooves, as well as being readily "shaped" to accommodate the changing size and shape of the horse's hoofs.

In the field of sports' horseshoe pitching, regulation metal pitching horseshoes weight 2.5 pounds. They are too heavy for most women, children, and elderly persons to pitch the required regulation 40 feet between posts. Rubber horseshoes have partially satisfied this disadvantage of metal horseshoes, but they not proven to be widely popular because they do not exhibit the desirable metallic sound of conventional metal horseshoes. The horse pitching shoes of the present invention not only possess a clear metallic ring when impacted on each other; but, as revealed in the specifications of this invention, they also possess other physical properties—such as high heat-stability, remarkable toughness and chemical resistance, easy adjustment with inexpensive equipment in the hands of the farrier to conform with varying natural hoof shapes and hoof growth, etc.

SUMMARY OF THE PRESENT INVENTION

In accordance with the present invention, light-weight, abrasion-resistant, shock-absorbant, metallic-sounding horseshoes are provided. Their properties clearly have unique advantages over the known disadvantages of metal horseshoes or horseshoes made from polyurethane, polycarbonate, or polyethylene raw materials.

The metallic-sounding polymer shoes of the present invention are fabricated from a family of relatively new commercially avaliable polymers known as polyphenylene sulfide polymers. They are thermoplastic and injection moldable. They possess a high melting point (over 500° F.) and outstanding chemical resistance. Special grades of this polymer that are loaded with fiberglass and/or mineral fillers possess high stiffness and retain mechanical properties under sever temperatures of over 450° F. The polyphenylene sulfide polymers of interest for this invention possess a high flexural modulus, flexural strength, and tensile strength. A further unique characteristic of these polymers is their very low mold shrinkage properties, both in the flow direction and in the transverse direction.

Horseshoes made from the polyphenylene sulfide polymers can be heated in excess of 450° F. so that a farrier can readily alter the size and shape of the shoe to accommodate changes in the size and shape of each growing or aging hoof.

Horseshoes produced from this new class polymers are about one-sixth the weight of the same size of the metal horseshoes and have much greater heat stability than any prior plastics used for horseshoes such as high molecular weight polyethylenes or polyurethanes. The polyethlenes and/or polyurethanes and/or polycarbonate resins disclosed in the above prior art deform and/or melt at temperatures at least 200° F. lower than the polyphenylene sulfide polymers of the present invention and DO NOT in any way exhibit even a semblance of the metallic ring of the horseshoes of the present invention. The unique polyphenylene sulfide polymers used in this invention have only recently become commerically available (1988).

The horseshoes of the present invention can, of course, be manufactured from polyphenylene sulfide resins containing additives to provide various colors, including ingredients to produce a metallic appearance that enhances the natural metallic sound of this polymer or special fibrous reinforcements such as glass or other fibers up to about 40 percent by weight. The horseshoes of the present invention can be heat-formed (cold forming will not suffice) to precisely fit the individual hoof.

Regular horseshoe nails may be used to attach the shoe effectively. An alternate method of attachment described herein is the use of special super-adhesive glue in combination with a degluing heatable spatula whereby the shoe may be easily removed, have its shape adjusted, and reapplied to the changing dimensions of the hoof with fresh adhesive.

The new family of polyphenylene sulfide polymers are manufactured by the Phillips Petroleum Company, Bartlesville, Oklahoma. They possess significantly superior shock absorbancy and impact and chemical reesistance as compared with prior plastics used with limited success for horseshoes.

The very high compressive strength and high IZOD impact resistance of the polyphenylene sulfide glass filber reinforced grades minimize wear and damage on hard surfaces while still providing good grip and allowing controlled action for normal leg action and breakover.

Actual wear data obtained from shoes of the present invention worn by horses indicate a useful life of the shoe comparable to iron or aluminum metal horseshoes and superior to other types of non-metallic shoes such as hard rubber, polyurethane, polycarbonate, or polyethylene shoes.

EXAMPLE 1

The raw material used to produce metallic-sounding horseshoes is Rytan-100 (polyphenylene sulfide polymer-Phillips Petroleum Co.). This material was loaded with about 20 percent one-fourth inch glass fibers and contained a brown dye.

Injection molding conditions were as follows:

| | Cycle: Part Wt - 60 gms Shot Wt - 66 gms | |
|---|---|---|
| Time and Pressure Settings | Boost Time | 2.5 secs. |
| | Mold Fwd. Time | 20.0 secs. |
| | Mold Close Time | 55.0 secs. |
| | Shots per Hour | 60 |
| | Seconds per Shot | 60 |
| | Cushion | ¼ inch |
| Heat Settings | Nozzle | 580° F. |
| | Front Zone | 600° F. |
| | Rear Zone | 600° F. |
| | A-Side (Cavities) | 190° F. |
| | B-Side (Cores) | 190° F. |

Mold size was for a pony horseshoe (about 5¾"×5"), and injection molding was via an opening (gate) in the middle of the front part of the horseshoe.

EXAMPLE 2

The raw material used to produce metallic-sounding horseshoes of the standard medium size for full-grown horses is a special grade of Rytan-100 containing about 40 percent by weight of one-fourth inch glass fibers. The color of the resin was a simulated metal color almost identical to regular metal horseshoes.

Injection molding conditions were as follows:

| | Cycle: Part Wt - 60 gms Shot Wt - 66 gms | |
|---|---|---|
| Time and Pressure Settings | Boost Time | 3.0 secs. |
| | Mold Fwd. Time | 25.0 secs. |
| | Mold Close Time | 60.0 secs. |
| | Shots per Hour | 50 |
| | Seconds per Shot | 50 |
| | Cushion | ¼ inch |
| Heat Settings | Nozzle | 590° F. |
| | Front Zone | 610° F. |
| | Rear Zone | 610° F. |
| | A-Side (Cavities) | 195° F. |
| | B-Side (Cores) | 195° F. |

Mold size was for an average size metal horseshoe (about 6"×5¾"), and injection molding was via a gate opening at one end of the two tapered ends at the back of the horseshoe.

EXAMPLE 3

The raw material used to produce metallic horseshoe pitching shoes is a special grade of polyphenylene sulfide (Rytan-100) containing about 25 percent by weight of fine one-fourth inch aluminum fibers. Colors of the resin were green and red to match requirement for matching two pairs for sportwear use.

Injection molding conditions were as follows:

| | Cycle: Part Wt - 60 gms Shot Wt - 66 gms | |
|---|---|---|
| Time and Pressure Settings | Boost Time | 2.5 secs. |
| | Mold Fwd. Time | 20.0 secs. |
| | Mold Close Time | 60.0 secs. |
| | Shots per Hour | 50 |
| | Seconds per Shot | 50 |
| | Cushion | ¼ inch |
| Heat Settings | Nozzle | 585° F. |
| | Front Zone | 610° F. |
| | Rear Zone | 610° F. |
| | A-Side (Cavities) | 195° F. |
| | B-Side (Cores) | 195° F. |

Mold size for an average size metal pitching horseshoe (about 7¼"×3¾"), and injection molding was via a gate opening at one end of the two tapered ends at the back of the horseshoe.

In will also be apparent that numerous other modifications and variations may be made in the horseshoe of the present invention by anyone skilled in the art, in accordance with the principles of the invention hereinabove set forth, without any exercising of any invention ingenuity.

What is claimed is:

1. A horseshoe comprising a horseshoe-shaped body molded of a heat resistant, abrasion-resistant, high-impact, synthetic, polyphenylene sulfide resin.

2. The horseshoe of claim 1 wherein the polyphenylene sulfide resin forming said body is reinforced with an admixture of glass fibers.

3. The horseshoe of claim 1 wherein the polyphenylene sulfide resin is reinforced with aluminum fibers.

4. The horseshoe of claim 1 wherein the polyphenylene sulfide resin is reinforced with an admixture of fine aluminum fibers and glass fibers at least about one-eight inch in length or longer.

5. The horseshoe of claim 1 wherein said body is molded with horseshoe nail openings preformed therein.

6. The horseshoe of claim 1 wherein said body is molded with nail openings for gluing the shoe to the hoof using an appropriate superadhesive especially suitable for bonding with polyphenylene sulfide horseshoes.

7. The horseshoe of claim 1 wherein said body is molded for use for regulation and ordinary sportswear use.

8. The method of molding a horseshoe comprising the step of molding a horseshoe from a synthetic polyphenylene sulfide resin.

9. The method of molding a horseshoe for sportswear or decorative use comprising the step of molding such horseshoe from a synthetic polyphenylene sulfide resin.

10. The method of claim 8 wherein said horseshoe is applied to the underside of a horse's hoof using a superadhesive such as cyanacrylate or other suitable superadhesive cement.

11. The method of custom-forming a horseshoe to fit a horse's hoof of a specific contour, shape, and size, comprising the steps of molding said horseshoe of a polyphenylene sulfide resin into a standard horseshoe shape having continuous, uninterrupted peripheral edges, thereafter, placing said molded horseshoe against the underside of a specific hoof of the horse to which the shoe is to be fitted, determining the differences in contour, shape, and size between said horseshoe and the hoof against which it is fitted, and, thereafter, applying heat below the melting point of the resin but close enough to the melting point of the resin to permit mechanical pressure to eliminate the differences in contour, shape, and size between said horseshoe and said hoof, to thereby conform the horseshoe to said specific hoof so that the horseshoe will fit said hoof properly when attached thereto.

* * * * *